Oct. 7, 1930.  A. B. CADMAN ET AL  1,777,290
VEHICLE BRAKE
Filed March 8, 1928
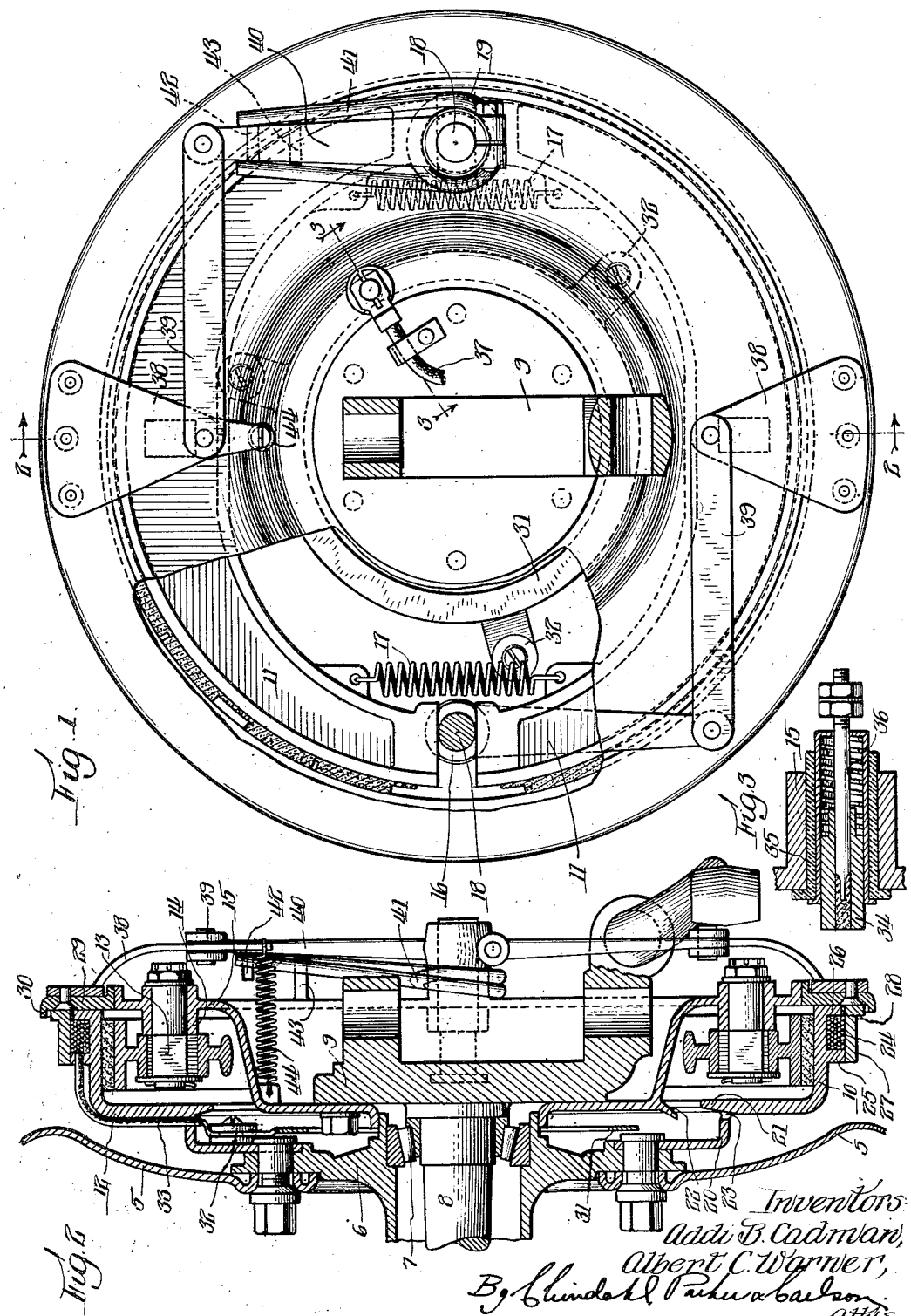
Inventors
Addi B. Cadman,
Albert C. Warner,
By Hindel & Parker & Carlson
Attys.

Patented Oct. 7, 1930

1,777,290

UNITED STATES PATENT OFFICE

ADDI BENJAMIN CADMAN AND ALBERT C. WARNER, OF BELOIT, WISCONSIN, ASSIGNORS TO WARNER ELECTRIC BRAKE CORPORATION, OF SOUTH BELOIT, ILLINOIS, A CORPORATION OF ILLINOIS

VEHICLE BRAKE

Application filed March 8, 1928. Serial No. 259,936.

This invention relates to friction vehicle brakes and more particularly to a brake wherein the braking action is determined by the degree of frictional gripping engagement between two co-acting magnetic elements.

One object of the invention is to provide a novel electric brake of the so-called momentum type associated with a vehicle wheel and having an electromagnet carried by a drum on the inner side of said wheel, the magnet constituting the driving element of a friction operator which has a co-acting driven element mounted for oscillatory movement and connected by force-augmenting mechanism to a friction brake associated with said drum.

Another object is to provide an electric brake including an annular electromagnetic element mounted on the inner side of the vehicle wheel to be braked and new and improved means providing an insulated circuit through the winding of said magnet.

A further object is to provide an electric brake for a vehicle wheel having two annular friction elements constituting a magnet and an armature, said armature being of light construction and mounted for slight axial movement relative to said magnet so as to compensate for any lateral wobbling of the vehicle wheel.

Other objects and advantages of the invention will become apparent from the following detailed description taken in connection with the accompanying drawings in which:

Figure 1 is an elevational view of a magnetic brake embodying the features of the present invention, a part of the brake casing being cut away to show the internal structure.

Fig. 2 is a vertical sectional view taken along the line 2—2 of Fig. 1.

Fig. 3 is a detail view taken along the line 3—3 of Fig. 1.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the exemplary embodiment illustrated in the drawings, the invention is applied to a front or dirigible vehicle wheel 5 of the disk type removably mounted on a hub 6 which, through suitable bearings 7, supports a spindle 8 projecting outwardly in the usual manner from a steering knuckle 9. The knuckle is forked to receive one outer end of the front vehicle axle to which it is connected for pivotal movement about an axis disposed closely adjacent the plane of rotation of the wheel.

The brake proper is of the internally expansible type comprising a drum 10 and a pair of segmental shoes 11 co-operating with the internal drum surface. Herein one end of the drum is substantially closed by a flange 12 which is securely bolted onto the inner side of the wheel hub 6. The brake shoes are covered with substantially rigid friction material and mounted in end-to-end relation within the drum. To hold the shoes centered and against rotation, they are mounted intermediate their ends on the inner ends of studs 13 supported in bosses 14 formed on a member 15.

The member 15 serves to close the open end of the drum and, in the present instance, is in the form of a plate secured to the steering knuckle 9 and recessed at its center to accommodate the knuckle, thus co-operating with the drum to form a closed annular casing around the steering knuckle.

As a means for spreading the brake shoes apart and thereby pressing the shoe coverings against the internal drum surface, two cam blocks 16 are mounted between the adjacent end portions of the shoes and provided with flattened sides against which the flattened ends of the shoes are normally held by contractile springs 17. Thus the shoes may be expanded upon oscillation of either of the cam blocks in either direction from their normal brake-released position. The cam blocks are rigid with the inner ends of rock shafts 18 journalled intermediate their ends in bearing bosses 19 on the member 15.

To prevent lubricants used on the wheel bearings from coming onto the brake surfaces, the drum flange 12 is formed with an inturned annular pocket 20 in which any lubricants are retained by a flange 21. A flange 22 is formed on a member 15 to deflect into the pocket lubricants escaping from the bearings 7. Openings 23 are provided in the drum through which the lubricants collecting in the pocket 20 are thrown by centrifugal action during rotation of the wheel.

The expanding cams 16 are adapted to be actuated by a friction operator deriving an actuating force from the motion or momentum of the vehicle. The operator comprises generally a force-augmenting mechanism connected to the expanding cams and two co-acting friction elements adapted to be brought into gripping engagement to actuate said mechanism. The driving friction element is in the form of an electromagnet carried externally of the drum while the driven element comprises a light metallic ring of magnetic material.

In the present instance, the magnet is formed by winding a conducting wire 24 around the periphery of the drum between two flanges 25 and 26 thereon and thereafter welding or otherwise securing a ring 27 of L-shaped cross section against the flanges. A ring 28 of non-magnetic material is provided between the flange 26 and the ring 27 to separate the two magnetic poles formed by the inner face of the flange 26 and the inner end of the ring 27, these pole faces being substantially flush with the inner end of the drum and arranged to constitute an annular friction surface.

The armature of the magnet comprises a flat and comparatively thin ring 29 of relatively narrow radial width and of a diameter equal to that of the magnet. At its inner edge, this ring is flanged and has bearing on the outer peripheral surface of the closure member 15. Thus a floating mounting is provided for the armature ring which allows for axial movement thereof to compensate for the inherent lateral wobbling of the friction surface of the magnet, which wobbling may be due to wear and inaccuracies in construction of the vehicle wheel, the drum, the bearings, etc. and may be of considerable magnitude owing to the relatively large tolerances allowed by present automobile practice in the construction and mounting of brake drums. This is especially true with the heavier passenger vehicles where drums of large diameters are employed. A flange 30 at the outer edge of the armature ring overlies the magnet so as to exclude dust and dirt from the co-acting friction surfaces.

The winding of the magnet is intended to be variably energized from a storage battery or other source of electric current so as to produce varying degrees of gripping engagement between the friction elements. To this end, one terminal of the winding is grounded to the drum and therefore to the vehicle frame. An insulated connection for the other terminal of the winding is provided which allows for rotation of the magnet with the wheel. For this purpose, a ring 31 of relatively small diameter is mounted on insulated studs 32 at the closed end of the drum and is connected to the winding by a conductor 33 extending through the drum. The ring 31 is engaged by a brush 34 (Fig. 3) mounted in a sleeve 35 of insulating material extending through the member 15, a spring 36 serving to maintain continuous contacting engagement between the brush and the ring 31. The outer end or shank of the brush provides a non-rotatable anchoring point for a flexible conductor 37 leading to the source of electric current. This type of connection is positive and reliable and is completely enclosed and protected by the casing provided by the drum and the closure member 15.

Two mechanical force-augmenting connections are provided in the present instance between the armature ring 29 and the two rock shafts 18. Each connection includes an arm 38 rigidly secured to the ring 29 and disposed in radial position. The inner end of each arm is pivotally connected to one end of a rigid link 39 the other end of which is pivotally joined to the free end of a crank arm 40 rigid with one rock shaft 18 and disposed outside of the closure member 15. Preferably the link 39 is of such length that the arms 38 and the cranks 40 are disposed in parallel relation so as not to be interfered with by the steering knuckle in their angular movement in either direction.

To effectively maintain the operating connections in normal brake-released position while the magnet is deenergized, coiled springs 41 of the hair-pin type may be employed, each being mounted on the hub of one of the crank arms 40 with their opposite ends bearing against opposite sides of two lugs 42 and 43 formed respectively on the crank 40 and the member 15. A tension spring 44 acting between the member 15 and the arm 38 serves to urge the armature ring continuously into mechanical contact with the friction surface of the magnet thereby maintaining a closed or substantially closed circuit for the initial flow of magnetic flux through the magnetic core and the armature at the instant when the magnet is energized. In order to minimize wear on the friction surfaces and yet allow for the range of wobbling action which exists in automobile wheel assemblies, it is desirable that the spring 44 exert a relatively light pressure on the armature, at the same time insuring continuous mechanical contact between the magnetic elements by overcoming the inertia of the axially movable friction element. This result is accomplished to best advantage by providing a floating mounting for the armature, this being the lighter of the two magnetic elements and therefore more readily movable by a light spring. Strain on the supports for the floating element is also minimized, which is an advantage in automobile brake environments where it is desirable to minimize the weight of the parts and the wear incident to road vibration. It will be apparent that the advantages resulting from the provision of an axially movable or floating armature, as distinguished from a floating mounting for the magnet, obtain regardless of the location of the armature. That is to say, the armature may be mounted on the drum as well as on the anchor plate in the attainment of the advantages above mentioned.

In operation, the energization of the magnet attracts the armature ring 29 causing firm gripping engagement thereof with the surfaces of the magnetic poles. When thus attached to the drum, the ring moves in the direction of rotation of the drum and thereby oscillates the cranks and the cams to press the shoes against the drum. When the brake becomes set the reaction of the drum overcomes the frictional force tending to maintain continuity of angular motion between the magnetic elements; consequently the ring 29 slips relative to the drum but remains in brake-setting position as long as the magnet remains energized. Upon de-energization of the magnet, the springs 41 quickly restore the force-augmenting connections and the ring to normal brake-released position.

Among the advantages accruing from the location of the magnet on the drum are the decrease in the weight and therefore the inertia of the moving parts of the friction operator and the efficient utilization of the space around the steering knuckle. The mass of the armature is materially less than that of the magnet; consequently the armature responds to a small attractive force produced by energization of the magnet and is quickly drawn into firm gripping engagement with the magnet around its entire periphery. Since the operating parts have low inertia, their movement to actuate the brake shoes begins at the instant when gripping engagement between the friction elements is established. By mounting the magnet, which is necessarily more bulky than the armature, on the drum in a space which would not otherwise be utilized, an extremely compact arrangement of operating parts is effected without interfering with the steering knuckle when located close to the plane of rotation of the wheel.

We do not claim herein the specific construction of the connection between the driven friction element and the means for actuating the brake shoes, this specific construction forming the subject matter of a separate application by Addi Benjamin Cadman, Serial No. 221,904, filed September 26, 1927.

We claim as our invention:

1. An electric brake of the momentum type having, in combination with a vehicle wheel, a drum on the inner side of said wheel, braking means within said drum, a magnet on said drum providing a driving friction surface, a driven friction element having a friction surface adapted for co-acting gripping engagement with said driving surface upon the energization of said magnet, actuating mechanism for said braking means operatively connected to said driven element, and means providing an insulated electrical circuit through the winding of said magnet including a revolving contact member enclosed within and protected by said drum and a non-rotatable contact brush continuously engaging said member.

2. An electric brake of the momentum type comprising, in combination, with a vehicle wheel, a drum on said wheel, a stationary member co-operating with said drum to provide a closed annular casing, a magnet on said drum providing a driving friction surface, a driven friction element mounted for co-acting gripping engagement with said driving surface upon the energization of said magnet, and means providing an insulated circuit through the winding of said magnet including a contact ring disposed within said casing and rotatable with said drum, and a brush carried by said member and continuously engaging said ring.

3. An electric brake of the momentum type comprising, in combination with a vehicle wheel, a drum carried by said wheel, braking means engageable with said drum, an annular magnet carried by said drum and providing an inwardly facing friction surface, a ring of magnetic material opposite said surface on a floating mounting so as to be arranged to be drawn into gripping engagement with said surface by the axial force of magnetic attraction produced by energization of said magnet, and a force-augmenting mechanism for applying to said brake means the actuating force derived through the frictional gripping engagement of said magnet and said ring.

4. An electro-magnetic brake for a vehicle wheel having, in combination, an annular magnetic element carried by said wheel on the inner side thereof and having an annular friction surface of narrow radial width spaced a substantial distance from and disposed in a plane substantially perpendicular to the wheel axis, a second magnetic element of narrow radial width mounted opposite said first mentioned element and having a co-acting friction surface, a winding carried by one of said elements so as to constitute that element an electro-magnet and said other element an armature whereby to cause gripping engagement of the elements when the winding is energized, said armature having a floating mounting and arranged for slight axial movement relative to said magnet whereby to allow for any lateral wobbling of the rotatable element.

5. An electromagnetic brake of the momentum type for a vehicle wheel combining a drum rotatable with said wheel and providing a cylindrical friction surface, friction braking means engageable with said surface, a pair of friction rings of relatively narrow radial widths and composed of magnetic material, one being carried by said drum, the other being mounted for oscillation about the drum axis, an electromagnetic winding carried by one of said rings and adapted when energized to constitute an electromagnet which acts on the other element as an armature whereby to produce frictional gripping engagement between the coacting surfaces of the rings, the armature ring being floatingly mounted for axial movement to allow for the inherent lateral wobbling of the drum, the other ring being held against axial movement, spring means acting on said armature ring to urge the same toward the magnet ring and thereby maintain continuous mechanical contact between the friction surfaces of the rings, and means deriving an actuating force from said oscillatory ring and operable to apply the force to said braking means.

6. An electromagnetic brake of the momentum type for a vehicle wheel combining a drum rotatable with said wheel and providing a cylindrical friction surface, an element composed of magnetic material and having an annular friction surface, a magnetic winding associated with said element and adapted when energized to constitute the element an electromagnet, a second friction element in the form of a relatively light magnetic ring mounted for floating axial movement relative to said magnet and constituting an armature for said magnet so as to be brought into gripping engagement with the annular surface of the magnet upon energization of said winding, one of said elements being mounted on said drum, the other being mounted for angular movement about the drum axis, means acting to urge said elements into mechanical contact whereby to reduce the reluctance of the magnetic flux circuit through them at the time when said winding is energized, and means receiving an actuating force from the driven friction element and operable to apply the same to said braking means.

7. An electromagnetic brake of the momentum type for a vehicle wheel combining a drum rotatable with said wheel and providing a cylindrical friction surface, an element composed of magnetic material and having an annular surface of a diameter approximating that of said cylindrical surface, a magnetic winding associated with said element and adapted when energized to constitute the element an electromagnet, a second friction element in the form of a ring corresponding to the size of said magnet and composed of magnetic material so as to constitute an armature for the magnet, said second element being mounted for floating axial movement relative to said magnet and adapted to be brought into gripping engagement with the annular magnetic surface upon energization of said winding, one of said elements being mounted on the drum, the other being mounted for angular movement about the drum axis, spring means acting on said armature ring to urge the same toward said magnet and thereby maintain light mechanical contact between the friction surface of the two elements, and means receiving an actuating force from the driven element and operable to apply the same to said braking means.

8. An electromagnetic brake of the momentum type for a vehicle wheel combining a drum rotatable with said wheel and providing a cylindrical friction surface, an element composed of magnetic material and having an annular friction surface, a magnetic winding associated with said element and adapted when energized to constitute the element an electromagnet, a second friction element in the form of a relatively flat magnetic ring of narrow radial width mounted for floating axial movement relative to said magnet and constituting an armature for said magnet so as to be brought into gripping engagement with the annular surface of the magnet upon energization of said winding, one of said elements being mounted on said drum, the other being mounted for angular movement about the drum axes, means acting to urge said elements into mechanical contact whereby to reduce the reluctance of the magnetic flux circuit through them at the time when said winding is energized, and means receiving an actuating force from the driven friction element and operable to apply the same to said braking means.

In testimony whereof we have hereunto affixed our signatures.

ADDI BENJAMIN CADMAN.
ALBERT C. WARNER.